Aug. 8, 1933.  W. VAN B. ROBERTS  1,921,841
METHOD OF CHARGING ACCUMULATORS
Filed Jan. 13, 1930
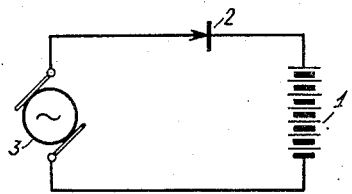
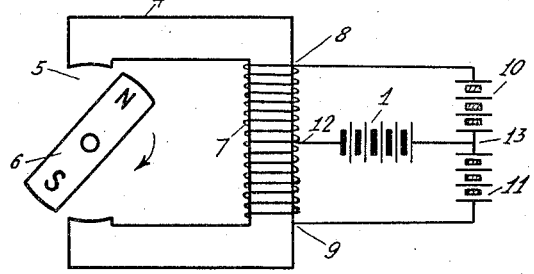
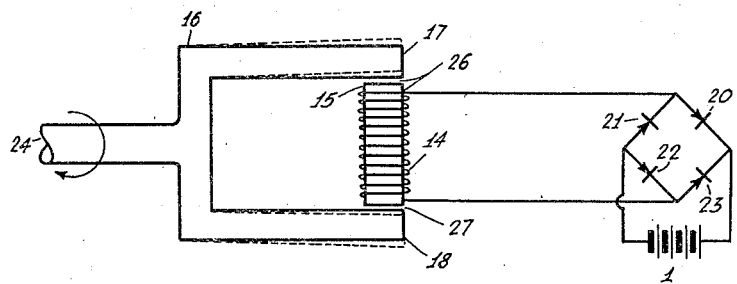
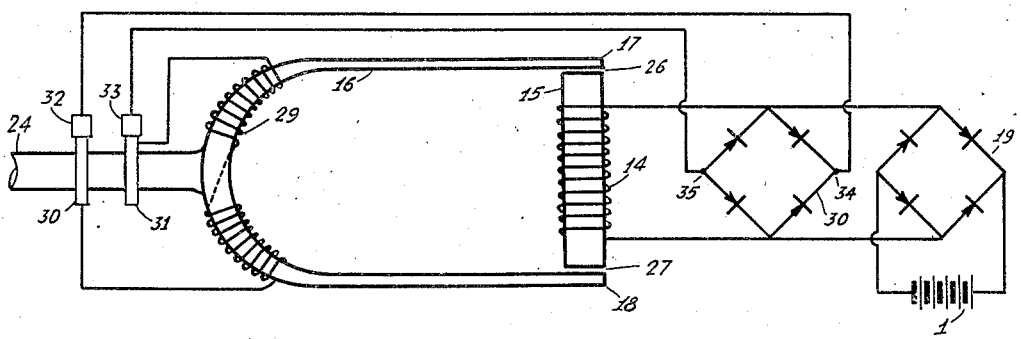
INVENTOR
WALTER VAN B. ROBERTS
BY
ATTORNEY Patented Aug. 8, 1933

1,921,841

UNITED STATES PATENT OFFICE 1,921,841

METHOD OF CHARGING ACCUMULATORS

Walter van B. Roberts, Princeton, N. J., assignor to Radio Corporation of America, a Corporation of Delaware Application January 13, 1930. Serial No. 420,405

1 Claim. (Cl. 171—314)

This invention relates to electrical apparatus and in particular to apparatus for charging accumulators or storage batteries to be used in particular on automobiles and generally in any place where an accumulator is in use at the present time.

In charging systems heretofore in universal use a direct current generator driven by an engine, as for instance, in automobile work the automobile engine charges the battery when the direct current generator voltage exceeds the battery voltage. The voltage applied to the battery depends to some extent on the speed of the driving motor. When the speed falls below a certain point the generator stops charging and the battery discharges through the generator. To overcome this defect a relay actuated when the generator voltage falls below a certain point is arranged to open the circuit between the generator and the battery and prevent the current from the battery from reversing the direction of flow and discharging the battery through the generator.

One disadvantage of this apparatus in use at the present time lies in the fact that if the speed of the motor is not maintained at or above a certain point the battery will not be charged.

Another disadvantage resulting from the use of the above apparatus is that if the charging voltage falls below a certain point the battery discharges through the generator.

A further disadvantage is that if the apparatus has been provided with a relay to disconnect the battery from the generator to prevent it from discharging in many instances the contacts in this relay circuit become dirty and stick preventing the operation of the relay and allowing the battery to remain in circuit with the generator thereby discharging the battery.

The primary object of the present invention is to overcome the above mentioned difficulties.

Another object of the present invention is to provide a novel and efficient means for charging a battery which means may be applied between automobile motors and ignition and lighting systems now in general use.

Another object of the present invention is to provide for charging apparatus in which all danger of discharging of the battery is eliminated.

Briefly, the above objects are obtained by employing as a source of energy an alternating current generator driven by an engine as for instance the automobile engine. The current from this alternating current generator is fed to a rectifier which has a sufficiently high resistance to reverse current to prevent any appreciable drain on the battery during periods when the generator is idle or where the generator voltage falls below a certain point.

According to one modification of my invention the alternating current applied to the rectifier is obtained by the use of a split winding on a magnetic circuit which is broken sufficiently to allow a permanent magnet to be rotated in said circuit at the required rate of speed by means of the automobile engine. In this modification full wave rectification is obtained by connecting a pair of rectifiers to the outer terminals of the winding on the magnetic circuit and connecting the battery to be charged between the center tap on said winding and the terminals of the rectifiers where they are joined together.

In cases where it is necessary that provision be made for insuring that the charging rate is constant or approximately constant I make use of a magnetic circuit in which the gap between the portion carrying the winding and the rotating portion is varied in accordance with the speed of rotation. At a high rate of speed the gap increases reducing the intensity of the field thereby compensating for the increased speed and as the speed decreases the space between the fixed portion and the rotating portion decreases increasing the intensity of the field thereby compensating for the reduction in speed.

Under certain conditions it might be desirable to have a generator in which the necessity of a permanent magnet is obviated, and in which the generator is self-exciting. This is accomplished by the use of an energizing winding supplied with current taken from a rectifier bridged across the output circuit of the generator.

Other objects and advantages will be had from the following specification and therefrom when read in connection with the drawing through which like reference numerals indicate like parts and in which, Figure 1 illustrates the broad idea used in my novel charging apparatus;

Figure 2 shows a full wave rectifier connected to the alternating current source; while, Figure 3 shows a full wave rectifier connecting the battery to a source of alternating current the potential of which is maintained substantially constant; and, Figure 4 shows a self-excited generator.

Referring to the drawing and in particular to Figure 1 thereof 1 indicates a battery to be charged, 2 indicates diagrammatically a rectifier, while 3 indicates a source of alternating potential. The rectifier 2 is, as pointed out above, a dry rectifier such as copper oxide rectifier. The resistance of this rectifier is sufficient to prevent the battery 1 from discharging through the generator 3 during the time which the voltage of the generator falls below charging voltage or when the generator is idle.

In Figure 2 is shown an arrangement consisting of a magnetic circuit 4 having an interrupted portion 5 in which a permanent magnet 6 having a north pole N and a south pole S is rotated at the required rate of speed. The magnet 6 may be driven by any available motor, as, for instance, an automobile motor. The magnetic flux set up in 4 induces in winding 7 an alternating current the frequency of which depends upon the speed of rotation of 6. The outer terminals 8, 9 of winding 7 are connected through rectifiers 10 and 11. The center tap 12 of winding 7 is connected through the battery 1 to be charged to the connection 13 between the rectifiers 10 and 11. In operation when 6 is rotated lines of force circulate in the magnetic circuit 4. This induces an alternating current into the winding 7. On one half of the cycle the current flows from the winding 7 through rectifier 10 and into the battery 1 while on the other half of the cycle flow of current in this side of the circuit is prevented by the high resistance of 10 while current flows in the other half of 7 through rectifier 11 to battery 1. Obviously, the rectifiers 10 and 11 prevent discharge of battery 1 when the generator 6, 4 is rotated at a low speed or is idle.

In Figure 3 is shown a modification in which provision is made for maintaining the alternating current potential applied to the rectifier substantially constant. In this arrangement a winding 14 is mounted on a magnetic core 15. A permanent magnet 16 is mounted for rotation in such a manner that the terminals of its arms 17 and 18, at a point in rotation are adjacent to the ends of the core 15, thereby completing a magnetic circuit through 15, 16. The permanent magnet 16 is arranged to be rotated by any available motor, as for instance, an automobile motor at the required speed, causes lines of force to flow in the magnetic circuit 15, 16 and thereby induces a current in winding 14. This voltage is applied across the terminals of a full wave rectifier 19 consisting of a plurality of dry rectifiers 20, 21, 22, and 23 of the type used in the previous modifications but arranged in a well known manner to obtain full wave rectification. The current from this rectifier is supplied to the battery 1 to be charged. If the speed of the motor driving shaft 24 of the rotatable permanent magnet 16 should increase to any extent the arms 17, 18 of said magnet spring outward as indicated in Figure 3 by the dotted lines thereby increasing the spaces 26, 27 between the core 15 and the arms 17 and 18 respectively of the rotatable permanent magnet 16. Obviously, this results in a reduction of potential in the current induced into winding 14. In this manner a substantially constant potential alternating current is applied from the winding 14 to the rectifier 19 and from the rectifier to the battery. In this modification as in the previous modifications discharge of the battery 1 through the alternating current source or winding 14 is prevented by the use of rectifiers of the type described above which have sufficient resistance to prevent reversal of the current.

In the modification shown in Figure 4 which is otherwise similar to that shown in Figure 3, core 16 is magnetized by means of a winding 29 the terminals of which are connected via slip rings 30, 31, contacts 32, 33 respectively bearing on said slip rings to the free arms 34, 35, of a rectifier 36 bridged across the output winding 14. The rectifier 36 operates at a voltage less than that necessary to charge battery 1 and a slight rotation of shaft 24 due to a small amount of residual magnetism in 16 energizes the winding 14 and the winding 29 through the rectifier 36. In this manner the strength of magnet 16 is built up until a charging voltage is applied to the battery 1 through rectifier 19. It will be understood that the use of the slip rings 30, 31 and cooperating contacts 32, 33 may be obviated by the use of an induction alternator of any known type.

In the arrangement in Figure 4 the voltage of the generated current is determined to some extent by the width of the gaps 26, 27 between the flexible arms 17, 18 of the rotatable member 16 and the ends of the member 15. The operation of this modification is otherwise the same as the operation of the apparatus of Figure 3.

Although for purposes of illustration I have shown the at present preferred form of charging device and various means for providing alternating current, therefore, it would be understood that any other type of alternating generator may be used to supply alternating current to the rectifier. While for purposes of illustration I have described my novel accumulator charging system as being applied to an automobile motor and ignition and lighting system, I do not limit myself to such showing as it will be understood that the charging device is applicable to mobile craft, as for instance, ships or airships which use accumulators.

I claim:

In charging apparatus in combination, a storage battery, a rectifier of the copper oxide type connected therewith and a rotational type generator of alternating currents having its output connected to the rectifier, said generator including a field winding and an armature winding one of which is rotatable with respect to the other and means for varying the voltage generated by the generator in a predetermined manner with respect to variations in the speed of rotation thereof, said rectifier being adapted through said connection to the storage battery to charge the same, an auxiliary rectifier of the copper oxide type connected across the output of the generator and conductively related to the field winding of the generator whereby electric current rectified by the auxiliary rectifier is caused to flow through the field winding of the generator to energize the same.

WALTER van B. ROBERTS.